United States Patent
Anderson et al.

(10) Patent No.: US 10,289,946 B1
(45) Date of Patent: *May 14, 2019

(54) MARINE VESSEL HULL WITH EMBEDDED WIRELESS IDENTIFICATION DEVICE

(71) Applicant: Brunswick Corporation, Lake Forest, IL (US)

(72) Inventors: Kevin R. Anderson, Fond du Lac, WI (US); Miles F. Gathright, New Smyrna Beach, FL (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,146

(22) Filed: Aug. 25, 2017

Related U.S. Application Data

(63) Continuation of application No. 15/056,467, filed on Feb. 29, 2016, now Pat. No. 9,779,351.

(51) Int. Cl.
  *G06K 19/077* (2006.01)
  *B63B 3/68* (2006.01)
  *B63B 3/20* (2006.01)

(52) U.S. Cl.
  CPC .......... *G06K 19/07758* (2013.01); *B63B 3/20* (2013.01); *B63B 3/68* (2013.01)

(58) Field of Classification Search
  CPC ........ G06K 19/07758; B63B 3/68; B63B 3/20
  See application file for complete search history.

(56) References Cited

U.S. PATENT DOCUMENTS

| | | |
|---|---|---|
| 4,073,049 A | 2/1978 | Lint |
| 5,787,836 A | 8/1998 | Blaisdell et al. |
| 6,265,457 B1 | 7/2001 | Dolgopolsky et al. |
| 6,331,028 B1 | 12/2001 | O'Neill et al. |
| 6,726,865 B2 | 4/2004 | Mielke et al. |
| 7,506,603 B2 | 3/2009 | Buzzi |
| 2003/0080919 A1 | 5/2003 | Forster et al. |
| 2005/0268734 A1 | 12/2005 | Watkins, Jr. et al. |
| 2007/0232164 A1 | 10/2007 | Swan et al. |
| 2009/0166429 A1* | 7/2009 | Aylmore ............... B29C 44/086 235/488 |
| 2012/0323763 A1 | 12/2012 | Michael |

FOREIGN PATENT DOCUMENTS

| | | |
|---|---|---|
| EP | 0417366 A2 | 3/1991 |
| WO | 2005120794 A1 | 12/2005 |

* cited by examiner

*Primary Examiner* — Anthony D Wiest
(74) *Attorney, Agent, or Firm* — Andrus Intellectual Property Law, LLP

(57) ABSTRACT

A marine vessel hull includes an outer hull layer and an inner liner connected to the outer hull layer forming a cavity therebetween. A wireless identification device is contained within the cavity between the outer hull layer and the inner liner. The wireless identification device stores and wirelessly transmits at least one of a vessel identifier, manufacture information, and ownership information for the marine vessel.

15 Claims, 7 Drawing Sheets

MARINE VESSEL HULL WITH EMBEDDED WIRELESS IDENTIFICATION DEVICE

CROSS REFERENCE TO RELATED APPLICATION

This application is a continuation of U.S. patent application Ser. No. 15/056,467, filed on Feb. 29, 2016, which is incorporated herein by reference in entirety.

FIELD

The present disclosure relates generally to the field of vehicle hulls, and more specifically, to hulls of marine vessels.

BACKGROUND

Various composite materials for vehicle hulls and processes are known in the art. Commonly, hull manufacture for hulls used in the marine industry incorporate molding processes for the outer surface elements of the shell of the hull, as well as for an inner portion of the hull. For example, hulls of marine vessels are often formed by connecting two or more molded portions together. For example, some marine vessel hulls are manufactured by providing an outer hull layer that forms the exterior surface of the marine vessel and then connecting an inner liner thereto such that a cavity is formed between the outer hull layer and the inner liner. In some embodiments, stringers, or braces, are positioned between the outer hull layer and the inner liner. In other embodiments, the inner liner is bonded directly to the outer hull layer without the use of stringers or braces therebetween. For example, U.S. Pat. No. 6,726,865 discloses a composite material for vehicle hulls and a hull molding process for molding an outer hull layer and an inner liner, and for mating the outer hull later and inner liner.

It is known in the mechanical arts that foam material formed from an exothermic reaction may be used as a flotation element between two sections of the hull. For example, an isocyanate and polyol may be used to create a foaming liquid that is spread on the inner surface of the hull portion before the hull portions are connected together or injected into a cavity between two hull portions that have been connected. The use of exothermic setting foam material in enclosed cavities is also known in other manufacturing and mechanical arts. In such processes, thermocouples are sometimes used in the development or testing of manufacture processes, for example to determine the heating or cooling curve of the foam in a manufactured product, or to determine setting times and/or a duration to reach the glass transition temperature.

SUMMARY

This Summary is provided herein to introduce a selection concepts that are further described herein below in the Detailed Description. This Summary is not intended to identify key or essential features from the claimed subject matter, nor is it intended to be used as an aid in limiting the scope of the claimed subject matter.

A marine vessel hull includes an outer hull layer and an inner liner connected to the outer hull layer forming a cavity therebetween. A wireless identification device is contained within the cavity between the outer hull layer and the inner liner. The wireless identification device stores and wirelessly transmits at least one of a vessel identifier, manufacture information, and ownership information for the marine vessel.

One embodiment of the method of constructing a hull of a marine vessel includes providing an outer hull layer and providing an inner liner that fits within the outer hull layer. The method further includes storing a vessel identifier on at least one wireless identification device, and placing the at least one wireless identification device on an interior surface of the outer hull layer or the inner liner. The inner liner and the outer hull layer are then connected such that a cavity is created between the interior surfaces of the outer hull layer and the inner liner, wherein the wireless identification device is contained within the cavity.

BRIEF DESCRIPTION OF THE DRAWINGS

Examples are described with reference to the following drawing FIGURES. Like reference numbers are used throughout the FIGURES to reference like features and components.

DETAILED DESCRIPTION OF THE DRAWINGS

Through their research and experience in the relevant field, the present inventors have recognized that a device and method is needed for identification of vessel hulls that can communicate wirelessly with a wireless receiving device in proximity of the vessel hull in order to identify the vessel hull, track the vessel hull during manufacture, and permanently store manufacture information about the vessel hull at a location that is contained within and permanently embedded into the hull itself. Moreover, the inventors have recognized that such a wireless identification device may be used to receive and store information about devices associated with the marine vessel, such as serial numbers of engines or electronic devices associated therewith and/or installed thereon, service records, vehicle history, owner identification information, insurance information, etc.

In recognition of the problems and needs in the marine vessel manufacture industry, the inventors developed the presently disclosed system and method of including a wireless identification device (wireless ID) contained within and embedded in a cavity between an outer hull layer and an inner hull liner of a marine vessel hull. The wireless identification device stores and wirelessly transmits information about the marine vessel, such as a vessel identifier, manufacturing information, or ownership information for the marine vessel. Any of several different potential wireless technologies may be utilized to transmit or receive data or information. The majority of these technologies are based on electromagnetic waves, with the primary differentiation being the frequency of the waves being used. Cost, size, communication distance, durability, and data transfer speed are some of the factors that could be considered when selection a specific wireless communication technology. In one embodiment, information is being transmitted to and received from the wireless ID by a reader that communicates therewith via radio frequency (RF). For example, the wireless identification device may be an active or passive RFID chip that exchanges data with an RFID reader, and such RFID chips are known and available in the art. For example, the RFID chip may have a built in antenna to receive and transmit RF signals and an integrated circuit that modulates and demodulates the RF signals, as well as processes and stores data. The RFID chip may be an active chip having a power source, such as a battery, or it may be a passive chip, sometimes also called an RFID tag, that is powered by an electric field created by the reader. Because the electronics are very small and are entombed between the layers of the vessel hull, they are extremely difficult to find and destroy by nefarious actors. Further, the entombed electronics are superbly protected from environmental damage.

Figure 1:
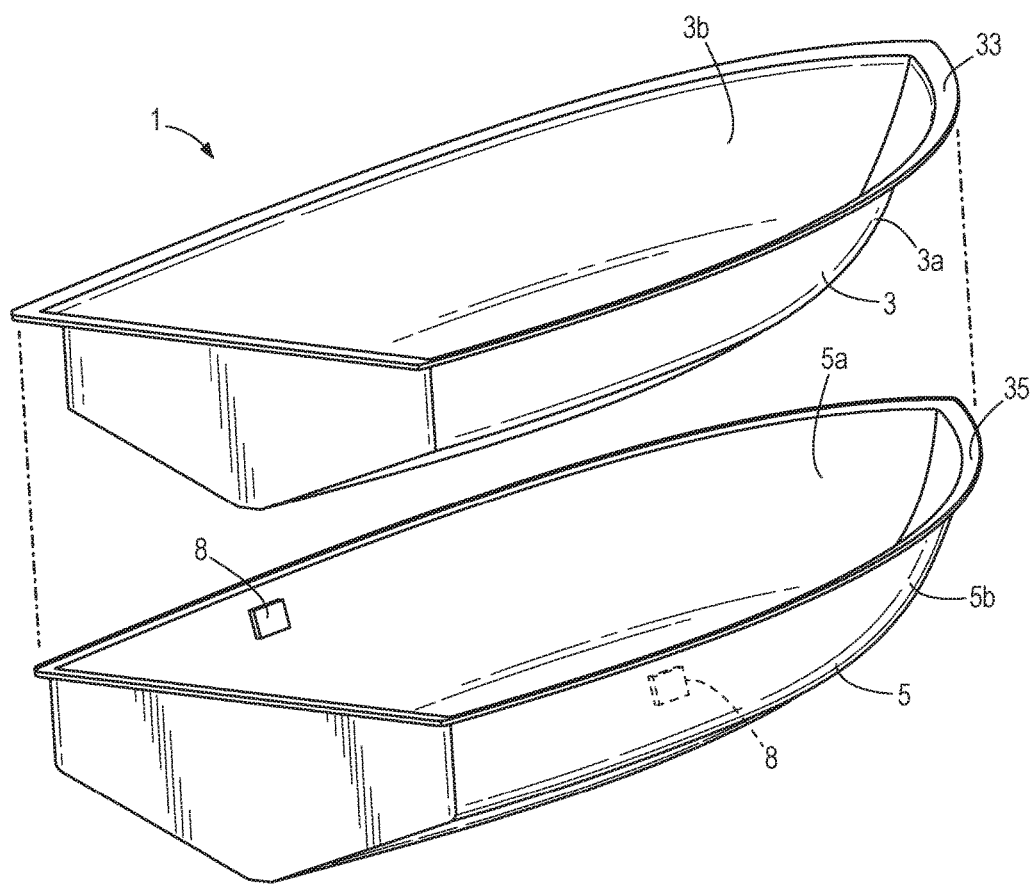
FIG. 1 depicts one embodiment of a marine vessel hull having a wireless identification device and a method of construction therefor.

FIG. 1 depicts one embodiment of a marine vessel hull 1 and associated method of construction. The marine vessel hull 1 includes an outer hull layer 5 having an exterior side 5b that forms the exterior of the hull of the marine vessel. The outer hull layer 5 also has an interior side 5a. The marine vessel hull 1 is also comprised of an inner liner 3 that fits within the outer hull layer 5. More specifically, the inner liner 3 is lowered into the outer hull layer 5 such that a top edge 33 of the inner liner 3 rests on a top edge 35 of the outer layer 5. The inner liner 3 is sized with respect to the outer hull layer 5 such that when the inner liner 3 is connected to the outer hull layer 5 a cavity 4 is created between the interior side 3a of the inner liner 3 and the interior side 5a of the outer hull layer 5 (see, e.g., FIG. 2). In the depicted embodiment, the shape of the inner liner 3 approximately follows the shape of the outer hull layer 5. However, in other embodiments, the shape of the inner liner 3 may be quite different than that of the outer hull layer 5. For example, the inner liner 3 may be shaped to create interior features of the marine vessel, such as seating, a floor surface for walking, a helm area, etc. In various embodiments, the depth of the cavity 4 between the inner liner 3 and the outer hull layer 5 may vary significantly at locations around the marine vessel.

At least one wireless ID 8 is placed on the outer hull layer 5 or the inner liner 3 prior to connection of the layers such that the wireless ID becomes entombed in the cavity 4 between the two layers. One or more wireless IDs 8 may be placed, for example, on an interior side 5a of the outer hull layer 5, as is depicted in the embodiment of FIG. 1. Alternatively, one or more of the wireless IDs 8 may be placed on the interior side 3a of the inner liner 3. In certain embodiments, wireless IDs 8 may be placed both on the interior side 5a of the outer hull layer 5 and on the interior side 3a of the inner liner 3 prior to connecting the layers.

Each wireless ID 8 may be configured to store a vessel identifier, such as a hull serial number, that uniquely identifies the respective marine vessel hull. The vessel identifier may be stored on each wireless ID 8 prior to entombing the wireless ID 8 between the hull layers 3 and 5. In other embodiments, the wireless ID 8 may be configured and the vessel identifier stored by wireless means after the wireless ID 8 is entombed in the vessel hull 1. For example, the reader 13 may be used to configure the one or more wireless IDs 8 and/or transmit the vessel identifier thereto once all of the wireless IDs have been installed and the inner liner 3 and outer layer 5 have been connected together.

The wireless IDs 8 may be configured to store any number of different types of information related to the marine vessel, including any vessel identifier, manufacture information, ownership information of the marine vessel, location information and/or location tracking of the marine vessel, etc. A vessel identifier could be any number, data, or information that could be used to identify the marine vessel, such as a hull serial number, a serial number of an associated device (such as an engine), or a manufacturer-specific number (such as a part number, batch number, etc.). Manufacture information could be any data or information relating to the manufacture of the vessel hull 1, and may include manufacturer identification, manufacture location, batch number, manufacture completion date, a batch number, an inspection result, an inspector identifier, or information recorded during the manufacturing process by sensors contained within in the cavity 4 between the outer hull layer 5 and the inner liner 3. Detailed manufacture information may be stored on one or more of the wireless IDs entombed in the marine vessel hull 1. For example, detailed construction information, such as people performing manufacturing steps or inspection steps, date, time, and shift information related to manufacture of the vessel, a list of inspection tests and results performed, etc., may be stored on a wireless ID 8 in the vessel hull 1. Manufacture information may be transmitted to and stored on the wireless IDs 8 at any time throughout the manufacturing process, and in one embodiment the wireless IDs 8 may be used to record execution of one or more of the manufacturing steps and/or as part of a system that automatically tracks the vessel throughout the manufacturing process. To provide one detailed example, one or more wireless IDs may be configured to allow tracking of the vessel hull 1 on the manufacture floor by communicating with readers that are strategically positioned throughout a manufacturing facility to automatically register and track the location of the vessel hull 1. Additionally, the wireless ID 8 may be used during the manufacture process to store and communicate manufacture instructions, such as a list of special options or configurations to be included on the relevant marine vessel. Alternatively, the manufacturing information may be stored on the wireless ID(s) 8 before the marine vessel leaves the manufacturing facility and used as record-keeping devices that are non-removable and permanently available.

One or more of the wireless IDs 8 in a vessel hull 1 may be configured to receive information from and/or communicate with other sensors or devices on the marine vessel, which may also be entombed in the marine vessel hull 1 and/or otherwise provided within communication range of the wireless ID 8. For example, the wireless ID 8 may be configured to communicate with a global positioning sensor (GPS) chip, which in some embodiments could also be entombed within the vessel hull 1, and the wireless ID 8 could be an active device sufficiently powered and configured to connect with available unsecured wireless networks in order to provide location of the marine vessel for anti-theft and recovery purposes. As an example, one GPS chip is part of the CC4000 GPS Platform that is manufactured by the Texas Instruments Corporation. This device communicates with numerous other technologies and can use NMEA protocols that are common in the marine industry.

In some embodiments, various sensors may also be entombed within the vessel hull 1 in order to record, store, and transmit information about the environment within the vessel hull 1, such as during the manufacture process. Through their experimentation and research in the relevant field, the inventors recognized that problems exist with vessel hull manufacture involving injection of exothermic setting foam material into the cavity 4 within the vessel hull 1 where the vessel hulls are damaged when vessel hulls are moved or the molds are parted before the foam material is sufficiently cooled. In view of their recognition of these manufacturing problems, the inventors developed a system using temperature sensors 10 entombed within the vessel hull and connected to the wireless ID 8. The wireless ID 8 is configured to receive the temperature information from the temperature sensors, and to store the temperature information in memory and/or transmit the temperature information to a reader 13. The temperature information measured by the temperature sensors 10 may be used to instruct and/or the manufacture process of each vessel hull 1, such as to determine whether the foam material within the cavity is below the glass transition temperature (Tg) of the foam and thus the vessel hull 1 can be moved and/or whether the foam material is sufficiently cooled so that the molds can be parted.

Figure 2:
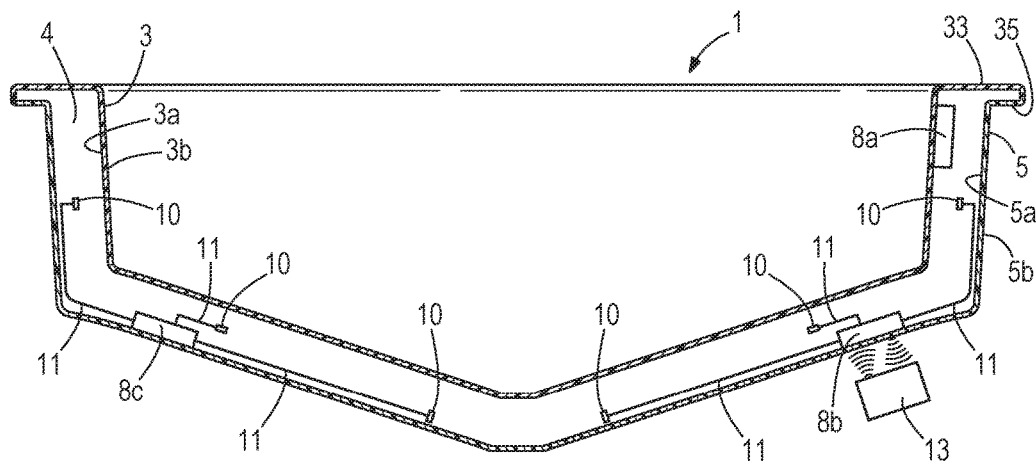
FIG. 2 provides a cross-sectional depiction of one embodiment of a marine vessel hull comprising wireless identification devices.

In the embodiment of FIG. 2, multiple temperature sensors 10 are also entombed within the vessel hull 1 and are connected to wireless IDs 8b and 8c. The temperature sensors may be used to track the temperature within the vessel hull 1 during the foam filling and setting process. As described herein, foam may be injected in the cavity 4 between the outer hull layer 5 and the inner liner 3. The foam may be used to fill the entire cavity 4 between the outer hull layer and the inner liner, or it may be used to fill one or more portions of the cavity 4.

In one embodiment, the foam material used is formed from an exothermic reaction between isocyanate and polyol, which gets very hot and may reach upwards of 400° F. Monitoring the temperature of the foam during the injection and setting process of each vessel hull 1 can provide information that helps determine when the foam is sufficiently set so that the vessel hull 1 can be moved and/or the mold around the outer hull layer 5 and/or the inner liner 3 can be parted. For example, the exothermic setting foam material has a glass transition temperature (Tg), which is the temperature region where the polymer transitions from a soft, flexible material that is very sensitive to deformation from movement shifts, to a hard material that will not deform when the vessel hull 1 is moved. Depending on the shape of the cavity 4 and the surrounding environmental conditions, the maximum temperature reached may vary significantly from hull to hull. Further, the temperature within the cavity 4 of each vessel hull 1 may vary significantly at different locations throughout. As described above, the cavity 4 may have a varied shape, as the shape of the inner liner 3 may be different than that of the outer hull layer 5, such as to create seating, a flat floor surface, or other functional aspects of the inside of the vessel. At locations where the cross-sectional area of the cavity 4 is larger, more heat will be created and will build up, and where the cavity is thinner, the maximum temperature reached will be relatively lower. To provide just one example, the temperature may reach 400° F. or higher in some areas of a vessel hull 1 where the cavity 4 has a relatively large cross-sectional area. It is important for all areas of the mold, including the hottest areas, to be below the Tg for that particular foam material or the material is too easily disturbed and damaged, causing cracking or irregularities within the vessel hull 1. Likewise, in processes involving molds that support the exterior surfaces of the hull layers, it is important that the foam material be sufficiently cooled prior to parting the mold because the hull layers may not be sufficiently strong to support the pressures created by the heat from the exothermic reaction, and thus parting the molds too early may irreparably damage the vessel hull 1.

The temperature sensors 10 may be any type of sensor capable of measuring heat, and is preferably a contact temperature sensor in physical contact with the foam material within the cavity 4. The temperature sensors 10 may be passive devices, such as thermocouples, thermistors, or resistive temperature detectors connected to the wireless ID 8 by wires. In other embodiments, the temperature sensors 10 may be active, self-powered devices, such as temperature sensor chips that automatically sense the temperature of the surrounding material at a predefined interval and transmit the temperature information to the respective wireless IDs. Such transmission could be via a standard conductor, or may be according to any known wireless protocol, and each wireless ID 8 would be configured accordingly. Preferably, the temperature sensor has a sufficient measurement range to measure temperatures at least as high as 400° F., or even higher. Likewise, in an embodiment where exothermic setting foam material is included in the vessel hull 1, preferably the wireless IDs are configured to perform in a wide range of temperatures, such as having an upper operating temperature above 400° F.

In the embodiment of FIG. 2, wireless IDs 8b and 8c each have three temperature sensors 10 connected thereto by wires 11. In one embodiment, the wireless IDs 8b and 8c are configured to take periodic temperature measurements with the respective temperature sensors 10 connected thereto. For example, the wireless IDs 8b and 8c may be configured to measure the temperature at the location of each temperature sensor 10 once every minute or once every five minute increment and to record the temperature in the memory of the wireless ID 8b and 8c. In another embodiment, the wireless IDs 8b and 8c may be configured to continually measure the temperature using each temperature sensor 10 and to store the temperature at defined temperature intervals, rather than defined time intervals. Thus, for example, the temperature information may be stored when the temperature in the area of each sensor reaches a predefined temperature interval, such as at every predefined degree increment or at important temperatures such as the Tg and/or the parting threshold temperatures. For instance, the wireless IDs 8b and 8c may be configured to record the time or measurement interval where the threshold temperature is reached.

The wireless IDs 8b and 8c may be further configured to generate alerts when the threshold temperatures are reached, such as by sending a signal to the reader 13 that the temperature is at or below the threshold temperature and/or sending a signal directly to a speaker device to generate an auditory alert. Alternatively or additionally, the wireless IDs 8b and 8c may send a signal to a device that creates a visual alert, such as to illuminate a light, when one or more of the temperature sensors 10 associated with that wireless ID 8b or 8c has reached a threshold temperature. The wireless ID 8b, 8c may generate the alert once all of the associated temperature sensors 10 have measured a temperature at or below the threshold temperature, or it may generate an alert providing information regarding each sensor measuring a temperature at or below the threshold temperature.

The temperature sensors 10 may be placed at various locations within the cavity 4. For example, it may be desirable to place temperature sensors 10 at or near locations in the cavity 4 that are likely to get the hottest and reach the Tg or parting temperature the latest, such as those areas in the cavity 4 with the largest cross-sectional area.

In various embodiments, the vessel hull 1 may be provided with multiple wireless IDs 8a, 8b, 8c, which may each be configured differently to store different information and provide different record keeping functions. In the embodiment of FIG. 2, for example, wireless ID 8a is placed at the interior side 3a of the inner liner 3 and does not have any temperature sensors 10 associated therewith. Wireless IDs 8b and 8c are provided on the interior side 5a of the outer hull layer 5 and each have three temperature sensors 10 connected thereto. In other embodiments, wireless IDs 8b and 8c may have different numbers of temperature sensors 10 connected thereto, and each wireless ID 8b and 8c may have a different number from one another depending on the temperature measurement needs within the vessel hull 1. Thus, depending on the configuration of the wireless IDs, including the type of transmitter receiver within the devices, the wireless ID 8a on the inner liner 3 may be better accessed with a reader 13 from the interior side of the vessel, and the wireless IDs 8b and 8c may be better accessed for wirelessly communicating with the reader 13 from the exterior of the vessel hull 1. For example, the wireless IDs 8b and 8c may be placed at a location that is easily accessed by someone on the manufacture floor, such as being provided at approximately eye level so that a manufacturer can easily place a reader 13 in near field communication with the wireless IDs 8b and 8c in order to obtain temperature information therefrom. Similarly, the wireless ID 8a may be placed at a location accessible by a user standing in the finished interior of the marine vessel, such as to be accessible by an end-user. For example, the wireless ID 8a could be used to track maintenance of the marine vessel and its associated devices, such as its engines. The wireless ID 8a may also store and provide a user manual for the marine vessel and/or its associated devices. The wireless ID 8a may be used to store any other data that has utility to an owner, which would eliminate the need to keep paper records stored on the vessel. Such records may also include insurance information, warranty information, service provide contact information, etc. Such information could also be accessible to the service providers, which would easily be able to access serial numbers, maintenance records, etc. which would be useful to anyone performing work on the marine vessel.

The relevant locations of the wireless IDs 8 may be indicated on the exterior of the vessel hull 1, such as by a visual indicator formed into the gel coating and/or fiberglass layer of the outer hull layer 5 or inner liner 3 at the location of the wireless ID 8. The visual indicator may assist a manufacturer, user, owner, maintenance provider, etc. in locating the position of the wireless ID 8 that is entombed within the vessel hull 1. Alternatively or additionally, it may be desirable to provide one or more wireless IDs 8 within the vessel that are not marked, and thus may serve as hidden identifiers which could be used to identify a marine vessel, such as for tracking purposes.

Figure 3:
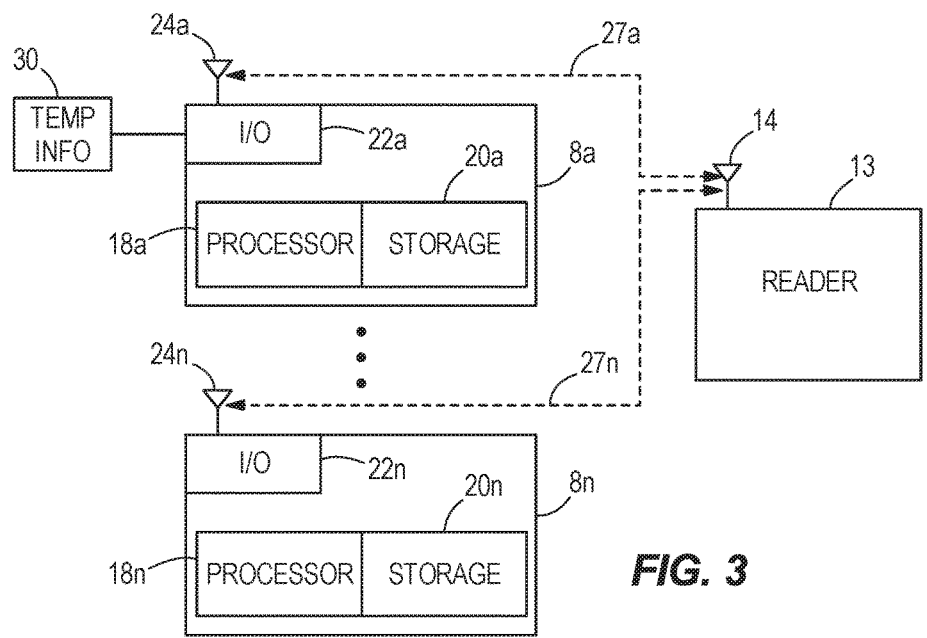
FIG. 3 is a block diagram of wireless identification devices of a marine vessel in communication with a reader.

FIG. 3 depicts one embodiment of a set of wireless IDs 8a-8n that may be included in a marine vessel hull 1 as described herein. Each wireless ID 8a-8n may be configured differently. For example, wireless ID 8a may be configured to receive temperature information 30, such as from temperature sensors as described herein. Each wireless ID 8a-8n communicates wirelessly via wireless communication link 27a-27n with the reader 13. Each wireless ID 8a-8n has an antenna 24a-24n configured to receive and transmit data with the reader 13, which has antenna 14, via wireless communication link 27a-27n. The wireless ID 8a, 8n may further include a processor 18a, 18n, memory 20a, 20n, and a communication interface 22a, 22n that interfaces between the input/output devices (including the antenna 24a, 24n, external sensors, etc.) and the processor 18a, 18n. For example, one or more of the wireless IDs 8a-8n may be RFID transponder chips, which may be passive or active devices configured to communicate with the reader 13 via one or more radio frequency protocols. The RFID chips may communicate with the reader according to any of various transmission protocols, including but not limited to near field communication (NFC), Wi-Fi, Bluetooth, Bluetooth low energy (BLE), ANT, ZigBee, or the like. The wireless ID 8a, 8n may also be configured to provide the signal transmission to the reader 13 at any of various signal powers, depending on the requirement of the communication protocol, the intended use of the respective wireless ID 8a, 8n, the power available to the device, etc.

Each respective wireless ID 8a, 8n may be an active RFID chip possessing its own power source and transmitter enabling the chip to broadcast its signal, either continuously or at desired intervals. Active wireless IDs 8a, 8n would likely provide longer read ranges and greater memory capacities compared to their passive RFID chip counterparts. For example, the active RFID chips may be powered by a long-life battery that will last up to a few years. However, depending on the demand placed on the wireless ID tag 8a, 8n, the battery will eventually die. Due to the configuration of the system where the wireless IDs 8a-8n are permanently entombed within the vessel hull 1, the batteries of the wireless IDs 8a-8n will not be able to be replaced. At that point, the wireless ID 8a, 8n may become a passive RFID tag that is powered by an interrogating signal from the reader 13. The passive wireless ID 8a, 8n would only be powered to transmit, receive, and store data when it was within range of the electromagnetic waves transmitted by the reader 13. In some embodiments, all or some of the wireless IDs 8a-8n may be passive RFID chips from the start and may not contain any internal power source.

The reader may be any device configured to wirelessly communicate with the respective wireless IDs 8a-8n via communication links 27a-27n. The reader has antenna 14, and may also comprise a processor and internal memory. The reader 13 may be a dedicated device configured for the purpose of communicating with the wireless IDs 8a-8n, or the reader may be a standard portable computing device, such as a cell phone or tablet, configured with hardware and software to communicate with RFID chips. For example, the reader 13 may be a standard portable consumer electronic, such as a user's cell phone, configured with an application for communicating with the wireless IDs, such as an NFC reader application. The reader may be configured to communicate with multiple or all of the wireless IDs 8a-8n simultaneously, such as in embodiments where one or more of the wireless ID 8a-8n are active RFID chips that transmit information to the reader 13 at regular intervals determined by the programming of the respective wireless ID 8a-8n. In other embodiments, the reader 13 may be configured to communicate with one wireless ID 8a, 8n at a time, such as in an embodiment where the wireless ID 8a, 8n and the reader 13 communicate via NFC requiring the reader 13 must be in close proximity to the respective wireless ID 8a, 8n. In certain embodiments, the wireless ID 8a, 8n and the reader 13 may be configured to communicate via more than one communication protocol, which may include both a near field communication protocol and a longer range communication protocol. For example, the devices may be configured to communicate via high frequency NFC and a longer range high frequency (HF) RFID protocol at the same frequency range (13.56 MHz). Thus, the system may operate such that the respective wireless IDs 8a, 8n can transmit information to the reader 13 according to its own internal programming run on the processor 18a, 18n, and can also respond to interrogation by the reader 13 when the reader is placed in near field communication range of the respective wireless ID 8a, 8n.

Any number of devices available in the art may be appropriate for use as a wireless ID 8a, 8n. To provide one exemplary embodiment, one or more of the wireless IDs 8a-8n may be an NFC/RFID integrated circuit, such as Part No. RF430FRL152H by Texas Instruments of Dallas, Tex., which is a 13.56 MHz transponder chip with a programmable 16-bit MSP430 low-power microcontroller and embedded universal FRAN non-volatile memory for storage of programming code or data, such as the vessel identifier, manufacturer information, or ownership information discussed herein. This exemplary NFC/RFID integrated circuit device may be configured as an active device with a battery, or to be a passive device activated by a 13.56 MHz H-field supply.

In other embodiments, each wireless ID 8a-8n may be any electronic device or group of devices configured for wireless communication and including any type of processing or logic device, and any type of memory or storage media, which may include volatile and non-volatile, removable and non-removable media implemented in any method or technology for storage of information, such as computer readable instructions, data structures, program modules, or other data. Examples of storage media include random access memory, read-only memory, flash memory, magnetic storage devices, or any other medium known in the art for storage of information and that may be accessed by an instruction execution system.

Figure 4:
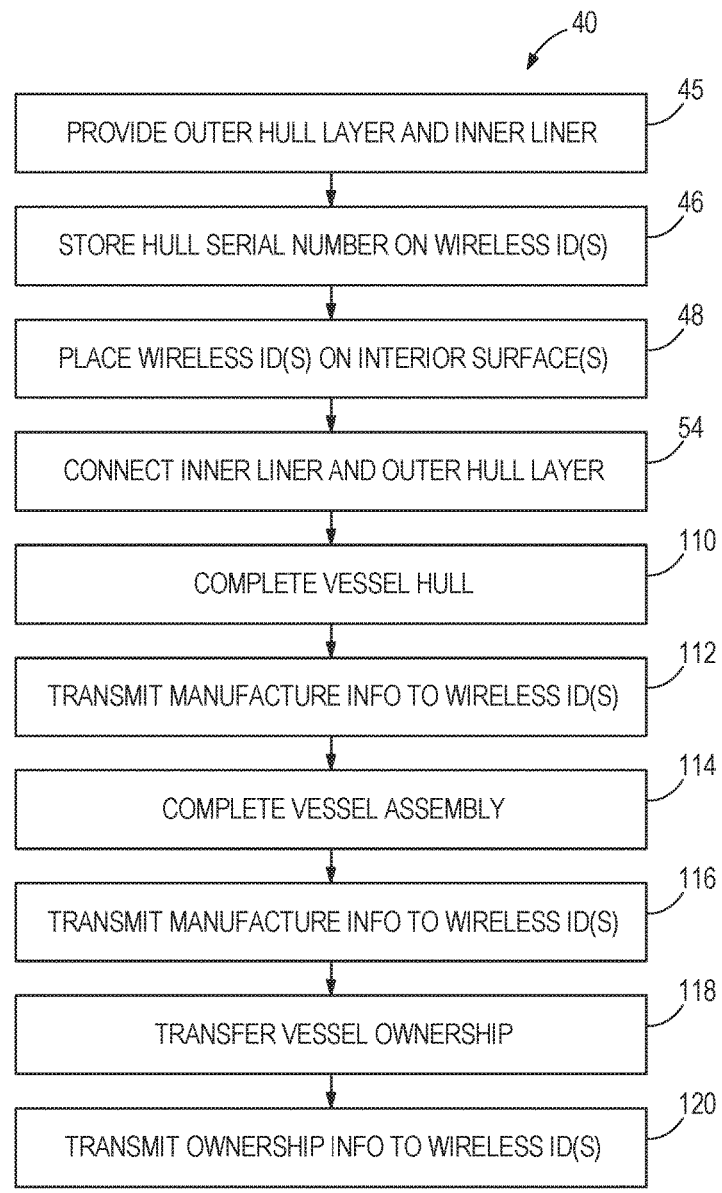
FIG. 4 depicts one embodiment of a method of constructing a hull of a marine vessel.
Figure 5:
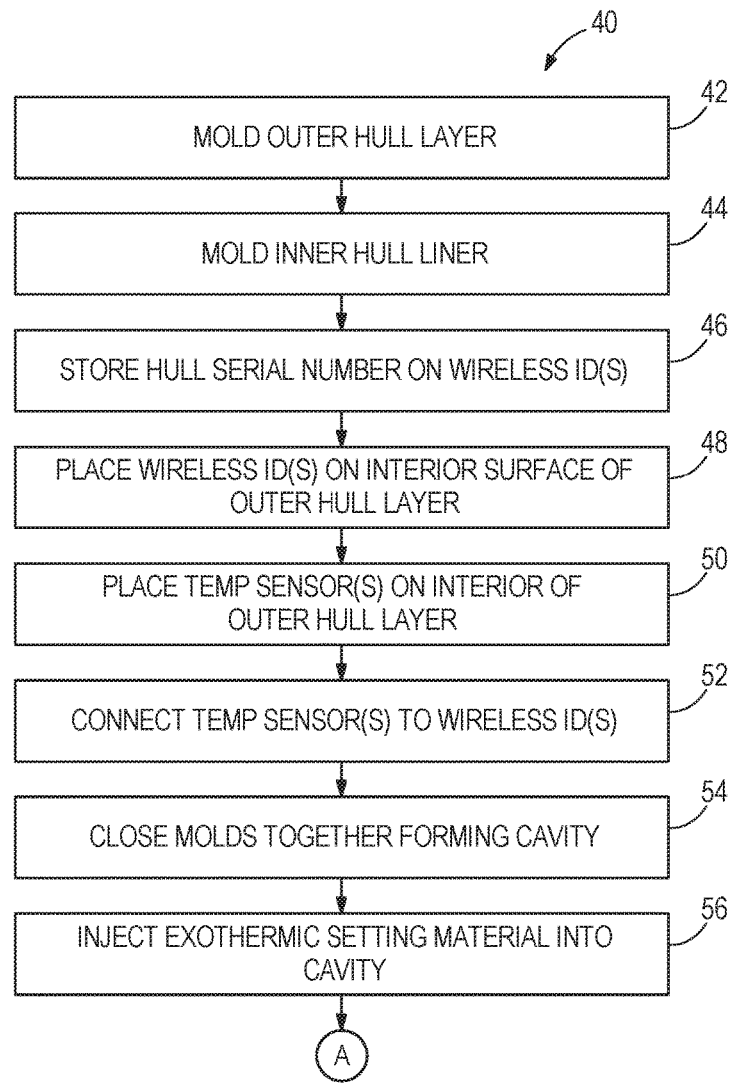
FIGS. 5-8 depict various embodiments of methods of constructing a hull of a marine vessel.

FIG. 4 provides one embodiment of a method 40 of constructing a marine vessel hull. At step 45, an outer hull layer and an inner hull liner are provided. A hull serial number is stored on one or more wireless IDs at step 46. The wireless IDs are then placed on the interior surface of at least one of the outer hull layer and the inner hull liner. For example, where multiple wireless IDs are being used they may be placed on both the outer hull layer and the inner hull liner, such as the embodiment depicted in FIG. 2. The inner liner and the outer hull layer are connected at step 54, such as by lowering the inner liner onto the outer hull layer as depicted in FIG. 1. Thereby, a cavity is created between the outer hull layer and the inner liner that contains the one or more wireless IDs. The vessel hull manufacturing is then completed, represented by step 110, and manufacturing information is transmitted to the wireless IDs at step 112 where it will be stored in the memory of the wireless ID. For example, the manufacture location, completion date and time, inspection results, inspector name, and any other information related to the manufacture of the vessel hull may be transmitted to and stored on one or more of the wireless IDs. The vessel assembly may then be completed at step 114, such as by installing engines, gauges, electronics and other circuitry, seating, etc. on the marine vessel. Further manufacturing information may then be transmitted to the wireless IDs at step 116 for storage thereon, which may include engine serial numbers and serial numbers for other devices installed on the vessel, as well as completion and inspection information similar to that listed above with respect to step 112. Further, user manuals for the marine vessel and associated devices may also be transmitted to and stored on the wireless IDs at step 116, for example. Once the vessel is completed and ownership is transferred, as represented at step 118, ownership information may be transmitted to and stored on the wireless IDs at step 120. For example, an owners name or contact information may be stored, or an insurance identification and insurance contact information may be stored, or both.

FIGS. 5-8 provide various embodiments of a method 40 of constructing a marine vessel hull. The outer hull layer is molded at step 42, such as on a bottom mold, and the inner liner is molded at step 44, such as on a top mold. Various molding processes for forming vessel hull layers are known in the art, and one example of such a molding process using a top and bottom mold is described at U.S. Pat. No. 6,726,865, which has been incorporated herein by reference. For example, the molds for the outer hull layer and the inner liner may be open molds, which are known in the maritime industry, or may be an equivalent. Further, the molds may be configured so that they can be closed together, such as by lowering the top mold having the inner liner onto the bottom mold having the outer hull layer.

At step 46, the hull serial number is stored on each of the wireless IDs, such as by transmitting the serial number to RFID chips that will serve as the wireless IDs using a reader as described herein. The wireless IDs are then placed on the interior surface of the outer hull layer at step 48. For example, multiple wireless IDs may be placed at locations near where the temperature will be monitored by temperature sensors, which are then placed on the outer hull layer at step 50. As described above, the temperature sensors may be strategically placed at locations that are likely to get the hottest and/or cool the slowest during the exothermic foam setting process. At step 52, the temperature sensors are connected to the wireless IDs, such as by connecting wires between thermocouple temperature sensors and respective terminals on a respective wireless ID. Top and bottom molds are then closed together at step 54 which forms a cavity between the interior surfaces of the outer hull layer and the inner liner that contains the wireless IDs and the temperature sensors. Prior to closing the molds together, an adhesive may be placed between mating portions of the outer hull layer and the inner hull liner in order to form a permanent, sealed connection between the two layers when the molds are closed together.

An exothermic setting material is then injected into the cavity at step 56, which will cause the formation of foam that will fill a portion of or the entirety of the cavity. Since the molds are still in place when the foam is introduced, the expansion of the foam and the pressures caused by the heat generated by the exothermic reaction do not force the outer hull layer and the inner hull liner apart. Various steps, such as those exemplified in FIGS. 6-8, may be executed that use the temperature information measured by the temperature sensors to monitor the conditions within the vessel hull and to determine when the foam is sufficiently set such that the vessel hull may be moved and/or the molds parted.

Figure 6:
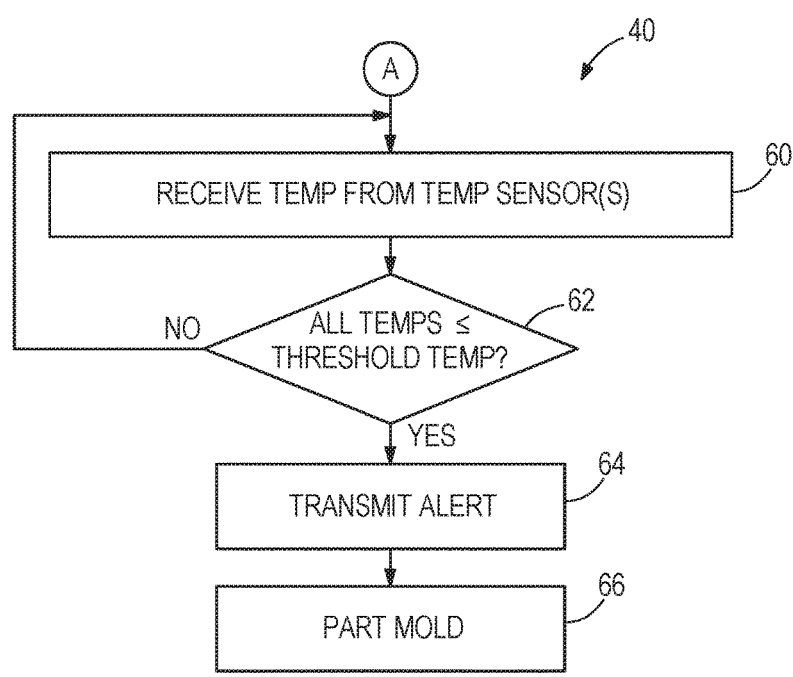

FIG. 6 depicts one embodiment of a method 40 of constructing a vessel hull implementing method steps based on temperature measurements from temperature sensors within the vessel hull. Temperature information is received from the temperature sensors at step 60. As described above, the temperature sensors may be active devices that transmit the temperature to the wireless IDs or passive devices operated by the wireless IDs to measure the temperature in the area of the one or more temperature sensors. Each wireless ID determines whether the temperatures measured by the associated temperature sensors are less than or equal to a threshold temperature, represented at step 62. For example, the threshold temperature may be the parting temperature—i.e., the temperature at which the foam is sufficiently cooled such that the molds can be parted without risking damaging any of the vessel hull layers—which may be determined as a certain percentage below the Tg, for example. If all of the measured temperatures are not at or below the threshold temperature, then the wireless identifier continues to receive temperatures from the associated temperature sensors until all measured temperatures reach the threshold. Once the threshold is reached at step 62, then the wireless ID transmits an alert at step 64, such as by transmitting a signal to the associated reader providing information that the relevant sensors have reached the threshold. The alert may be provided, such as by the reader, to the manufacturing personnel, which may then part the mold at step 66.

Figure 7:
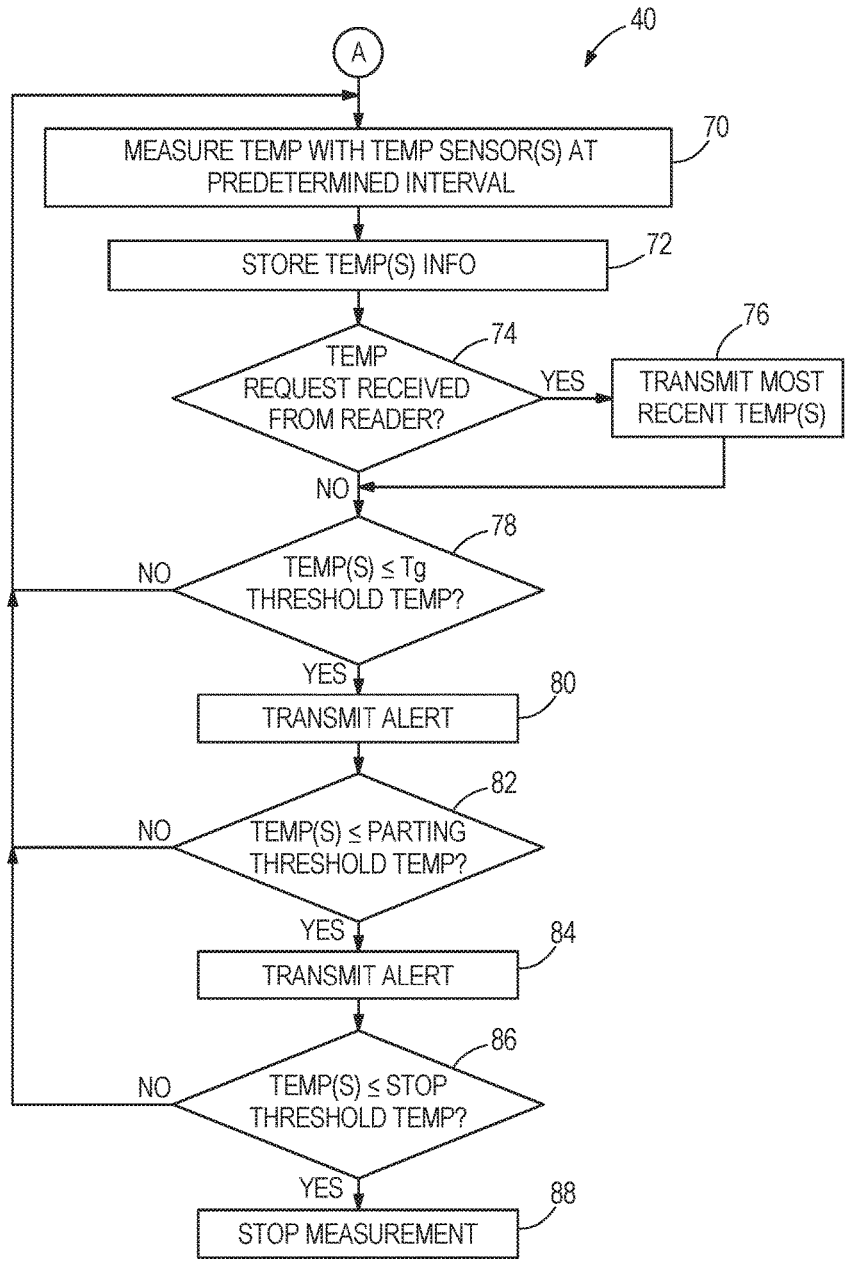

FIG. 7 depicts another embodiment of method steps for controlling the manufacture of a marine vessel using the temperature information from temperature sensors entombed within the vessel hull. Temperature is measured with the temperature sensors at predetermined intervals at step 70. For example, the one or more wireless IDs may be configured to operate the temperature sensor to measure the temperature at intervals set by the user prior to enclosing the wireless IDs within the cavity of the vessel hull. The temperature information is stored in the memory of the wireless ID at step 72. Any time the wireless ID receives a request from an associated reader, represented at step 74, then it may transmit the stored temperature information. For example, the wireless ID may transmit the most recently measured temperature information, represented at step 76. Alternatively, the wireless ID may transmit multiple temperature recordings, or all of the stored temperature information in response to the request. In general, the wireless IDs may be configured to respond to a request from the reader any time that such a request is received.

At step 78, the wireless ID determines whether the most recent temperature measured by each of the one or more temperature sensors is less than or equal to the Tg for the respective material. If not, then the wireless ID continues to execute the steps 70 and 72 to monitor the temperature until the Tg is reached. Once the Tg is reached at step 78, then an alert is transmitted at step 80. For example, an alert may be transmitted to the reader, which may then indicate to the manufacturing personnel that it is safe to move the mold containing the vessel hull. At step 82, the wireless ID determines whether the most recently measured temperature by each of the one or more temperature sensors is less than or equal to the parting threshold temperature. If not, then the wireless ID continues to measure and store the temperatures at steps 70 and 72 until the parting threshold temperature is reached. Once the parting threshold temperature is measured by all of the temperature sensors associated with the wireless ID, then the wireless ID transmits an alert to the reader at step 84, such as to provide an indicator to the manufacturing personnel that it is safe to remove the top mold from the bottom mold in order to expose the vessel hull. The wireless ID may be configured to continue executing steps 70 and 72 to measure and store the temperatures until a stop threshold is reached at step 86. The stop threshold temperature may be any temperature below the parting threshold temperature, such as room temperature, for example. Once the stop threshold temperature is reached at step 86, then the temperature measurement process is ended, represented as step 88.

Figure 8:
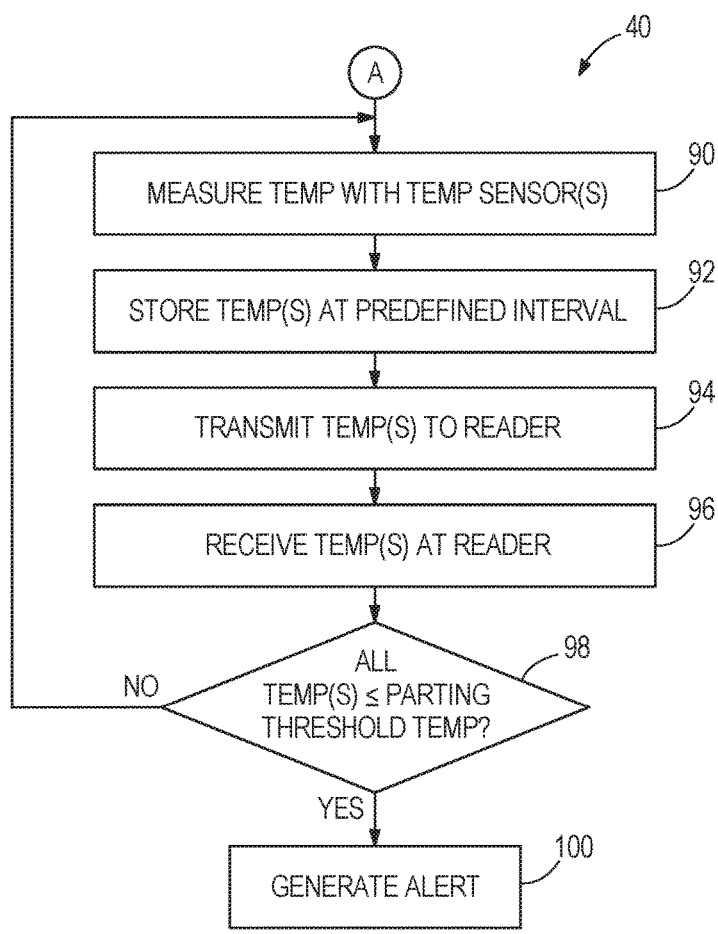

FIG. 8 represents another exemplary embodiment of a method 40 of constructing a vessel hull utilizing temperature information from the one or more temperature sensors. At step 90, the temperature is measured with the one or more temperature sensors. The temperature may be measured at predefined intervals, or may be measured continuously. The temperatures are stored at predefined intervals, represented at step 92. As described herein, the predefined intervals may be time intervals or temperature intervals. Thus, to provide an explanatory example, the wireless ID may store the temperature information every five minutes, or the wireless ID may store the time at which every 5° F. interval is reached. The temperature information is transmitted to the reader at step 94, which may include transmitting all of the stored temperature information or a portion thereof. For example, the wireless ID may be configured to transmit each stored temperature information when it is stored at the predefined interval. The transmitted temperature information is received at the reader at step 96. The reader then executes programming to determine whether certain temperature thresholds have been reached. For example, at step 98 the reader may assess whether the most recent temperature information measured by all of the one or more temperature sensors has reached the parting threshold temperature. If so, then the reader may generate an alert at step 100. If not, then the reader may continue to monitor the temperature information until all temperature sensors read a temperature at or below the parting threshold temperature. In other embodiments, the temperature information from each temperature sensor may be assessed separately, and an alert created when each sensor measures a temperature at or below the relevant threshold.

In the present disclosure, certain terms have been used for brevity, clearness and understanding. No unnecessary limitations are to be implied therefrom beyond the requirement of the prior art because such terms are used for descriptive purposes only and are intended to be broadly construed. The different devices and methods described herein may be used alone or in combination with other devices and methods. Various equivalents, alternatives and modifications are possible within the scope of the appended claims.

What is claimed is:

1. A marine vessel hull comprising:
an outer hull layer;
an inner liner connected to the outer hull layer forming a cavity therebetween;
a foam material between the outer hull layer and the inner liner formed from an exothermic reaction in the cavity;
a wireless identification device contained within the cavity between the outer hull layer and the inner liner that stores and wirelessly transmits information for the marine vessel hull;
at least one temperature sensor that measures temperature within the cavity during the exothermic reaction and transmits temperature measurements to the wireless identification device; and
wherein the wireless identification device is configured to selectively store and/or selectively transmit temperature information based on the temperature measurements by the temperature sensors.

2. The marine vessel hull of claim 1, wherein the wireless identification device includes an RFID chip that transmits the information for the marine vessel hull to a reader.

3. The marine vessel hull of claim 2, wherein the wireless identification device is configured to transmit the temperature information to the reader at defined temperature intervals.

4. The marine vessel hull of claim 2, wherein the wireless identification device is also configured to transmit the temperature information to the reader in response to receiving a request from the reader.

5. The marine vessel hull of claim 2, wherein the wireless identification device is configured to transmit an alert to the reader when the temperature information of the foam material from at least one temperature sensor is at or below a threshold.

6. The marine vessel hull of claim 5, further comprising:
at least a second temperature sensor that measures temperature within the cavity during the exothermic reaction and communicates the temperature measurements to the wireless identification device; and
wherein the wireless identification device transmits an alert to the reader when the temperature information of the foam material from all temperature sensors is at or below the threshold.

7. The marine vessel hull of claim 1, further comprising:
a GPS chip contained within in the cavity between the outer hull layer and the inner liner and communicating a GPS location to the wireless identification device; and
wherein the wireless identification device transmits the GPS location determined by the GPS chip.

8. The marine vessel hull of claim 1, wherein the wireless identification device is configured to receive and store updated ownership information over a life of the marine vessel hull, wherein the updated ownership information includes at least one of an owner identifier, an insurance policy identifier, an owner manual, or maintenance information.

9. The marine vessel hull of claim 1, wherein the wireless identification device is located on an interior surface of the outer hull layer.

10. The marine vessel hull of claim 9, further comprising providing a visual indicator visible on an exterior surface of the outer hull layer indicating a location of the wireless identification device.

11. The marine vessel hull of claim 1, comprising at least two wireless identification devices, wherein at least one of the wireless identification devices is located on an interior surface of the outer hull layer and at least one of the wireless identification devices is located on an interior surface of the inner liner.

12. The marine vessel hull of claim 1, wherein the wireless identification device is further configured to compare the temperature measurements to a threshold temperature and to store a time or measurement interval where the temperature measurements for each of the at least one temperature sensor become less than or equal to the threshold temperature.

13. The marine vessel hull of claim 12, wherein the wireless identification device is further configured to wherein the wireless identification device is configured to transmit an alert when the temperature measurements for all of the at least one temperature sensor are less than the threshold temperature.

14. The marine vessel hull of claim 13, wherein the threshold temperature is a predefined parting temperature.

15. The marine vessel hull of claim 12, wherein the threshold temperature is a glass transition temperature.

* * * * *